(12) United States Patent
Hodes

(10) Patent No.: US 8,778,295 B2
(45) Date of Patent: Jul. 15, 2014

(54) COMBINATORIAL SYNTHESIS OF DIAMOND

(76) Inventor: Daniel Hodes, Great Falls, VA (US)

( * ) Notice: Subject to any disclaimer, the term of this patent is extended or adjusted under 35 U.S.C. 154(b) by 125 days.

(21) Appl. No.: 13/204,218

(22) Filed: Aug. 5, 2011

(65) Prior Publication Data

US 2012/0040868 A1    Feb. 16, 2012

Related U.S. Application Data

(60) Provisional application No. 61/344,510, filed on Aug. 11, 2010.

(51) Int. Cl.
| | |
|---|---|
| *B01J 3/06* | (2006.01) |
| *C01B 31/06* | (2006.01) |
| *C30B 28/06* | (2006.01) |
| *C23C 16/00* | (2006.01) |
| *C23C 16/26* | (2006.01) |
| *H05B 6/64* | (2006.01) |

(52) U.S. Cl.
USPC ............ 423/446; 423/445 B; 423/445 R; 117/79; 117/928; 117/929; 427/902; 427/249.12; 427/249.7; 427/249.8; 118/719; 118/715; 264/432

(58) Field of Classification Search
None
See application file for complete search history.

(56) References Cited

U.S. PATENT DOCUMENTS

| | | | |
|---|---|---|---|
| 3,630,768 A | 12/1971 | Bianchi et al. | |
| 4,434,188 A | 2/1984 | Kanno | |
| 5,051,785 A | 9/1991 | Beetz | |
| 5,201,986 A | 4/1993 | Ota | |
| 5,217,700 A | 6/1993 | Kurihare | |
| 5,470,661 A | 11/1995 | Bailey | |
| 5,547,716 A * | 8/1996 | Thaler | 427/577 |
| 5,569,501 A * | 10/1996 | Bailey et al. | 427/577 |
| 5,849,079 A | 12/1998 | Gruen | |
| 6,060,118 A | 5/2000 | Ishikura | |
| 6,342,195 B1 * | 1/2002 | Roy et al. | 423/446 |
| 6,858,080 B2 | 2/2005 | Linares | |
| 7,306,778 B2 | 12/2007 | Chaffin | |
| 7,368,013 B2 * | 5/2008 | Sung | 117/79 |
| 7,833,505 B2 * | 11/2010 | Donnet et al. | 423/445 R |
| 8,171,568 B2 * | 5/2012 | Freitas et al. | 850/61 |
| 8,276,211 B1 * | 9/2012 | Freitas et al. | 850/62 |

OTHER PUBLICATIONS

Maier, et al., "Tert.-Butyl-Substituierte Cyclobutadiene Und Cyclopentadienone" Tetrahedron Letters No. 11, pp. 1025-1030, 1972.
Maier, et al. "Tetrakis(trimethylsilyl)tetrahedrane" J. Am. Chem. Soc. 2002 124, 13819-13826.
Maier, et al. "Tetra-tert-butyltetrahedrane" Angew, Chem. Int. E. Engl. 17 (1978) No. 7.
Maier, et al., "Tetrakis(trimethylsilyl)cyclobutadiene and Tetrakis (trimethylsilyl)tetrahedrane." Angew. Chem. Int. Ed. 2001 40, No. 9.
Eaton & Cole, "Cubane" J.Am. Chem. Soc. 86, 962-963(1964).
Eaton & Cole, "Cubane" j. Am. Chem. Soc. 86, 3157-3158 (1964).

* cited by examiner

*Primary Examiner* — Guinever Grengorio

(57) ABSTRACT

Disclosed is a combinatorial synthesis of Diamond wherein a first reactive species is produced by catalytic treatment of Acetylene, a second reactive species is produced by decomposition of a hydrocarbon source having a low Hydrogen-to-Carbon ratio using a high energy discharge, and the two reactive species so obtained are combined in the vapor phase to yield Diamond without the need of post-treatments. The reaction is efficient and affords Diamond under mild conditions with high purity such that it may be useful for producing Diamond for semiconductor and microelectronics applications.

14 Claims, No Drawings

COMBINATORIAL SYNTHESIS OF DIAMOND

This application claims priority to U.S. Provisional Application 61/344,510, filed Aug. 11, 2010

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF THE INVENTION

This invention relates to a method for synthesizing Diamond by means of a combinatorial synthesis wherein a first chemical species reacts with a second chemical species under mild conditions to yield Diamond. The Diamond so produced is of high purity and does not require post treatment purifications such as high pressure and high temperature (HPHT) typical of the majority of Diamond syntheses.

BACKGROUND OF THE INVENTION

The crystalline form of Carbon designated as Diamond comprises as its basic unit cell five atoms disposed as a Platonic solid, the tetrahedron. Four of the Carbon atoms are located at each of the four apices of this solid. The fifth Carbon atom is located within the tetrahedron at the "cage" position.

All the bonds in Diamond are $sp^3$ hybridized. They are short, strong, uniform bonds. The unique properties of Diamond derive from the structure and bonding of this species.

Diamond is a valuable material due its properties of hardness (10 on the Mohs hardness scale), heat stability, high room temperature thermal conductivity (about 2000 W/mK), very low rms vibration at room temperature (0.002 nm), a high index of refraction (2.4), and optical transparency from infrared through ultraviolet. Because of its high band gap (5.45 ev) it is a superb electrical insulator ($10^{16}$ ohm). Boron doped (blue) Diamond has been found to be p-type semiconductor having a high hole mobility and electrical breakdown strength.

Many synthetic methods for Diamond are known. Typically, these methods involve high pressure, high temperatures, or high energy discharges. Moreover, post treatments are frequently necessary for purification. Most of these methods are unsuitable for producing Diamond of a character suitable for microelectronics materials and their applications. To this end vapor deposition and some flame techniques have been used.

One of the earliest examples of a vapor deposition process is that of Gardner, U.S. Pat. No. 3,630,768, in which hydrocarbon gas, possibly containing a dopant, is heated (800°-1450° C.) in the presence of Diamond seed crystals with rigorous exclusion of Oxygen contaminants at sub-atmospheric pressures. An Oxygen gas post-treatment is disclosed for the removal of any Graphite that may be formed.

Kamo et al., U.S. Pat. No. 4,434,188, employ a mixture of Hydrogen carrier gas and hydrocarbons in the presence of a microwave discharge at 300°-1300° C. to deposit Diamond on a substrate at low pressures.

Beetz et al., U.S. Pat. No. 5,051,785, disclose the formation of n-type Diamond by a chemical vapor deposition (CVD) process using a hot filament with a Hydrogen carrier gas and a hydrocarbon as the Carbon source with an n-type dopant source at 850° C. and 10 Torr pressure.

Ota et al, U.S. Pat. No. 5,201,986, disclose anodic deposition of Diamond from a Hydrogen/hydrocarbon gas mixture using a DC discharge at 1-10 Torr. They also produce Diamond from Hydrogen/hydrocarbon gas mixtures using laser CVD (U.S. Pat. No. 5,387,443).

Kurihara et al, U.S. Pat. No. 5,217,700, produce a good quality Diamond film using a torch technique wherein Oxygen and a hydrocarbon or a Hydrogen/hydrocarbon mixture deposit Diamond film from a flame.

Bailey et al., U.S. Pat. No. 5,470,661, produce Diamond film using plasma enhanced CVD (PECVD) with a Hydrogen free Helium/Acetylene gas mixture.

Gruen et al, U.S. Pat. No. 5,849,079, employ Argon, Hydrogen, and a carbonaceous vapor material (Methane, Acetylene, Fullerene dust) in a high energy discharge that affords a plasma from which a high quality Diamond film is deposited.

Ishikura et al. U.S. Pat. No. 6,060,118, produce Diamond by a CVD method using Methane in Hydrogen and a microwave discharge with a substrate temperature of about 650° C.

Linares et al. U.S. Pat. No. 6,858,080, produce Diamond structures from Methane, Hydrogen and trace Diborane at about 40 Torr using a microwave discharge to produce a plasma.

Chaffin, U.S. Pat. No. 7,306,778, produces Graphite free Diamond films using an inert gas and a Hydrocarbon such as Acetylene with a DC biased radio frequency (RF) discharge.

The methods of the related art form Diamond essentially by decomposition of a carbonaceous source material, and the Carbon so obtained forms Diamond. The present invention forms Diamond by a combinatorial synthesis wherein a first chemical species reacts with a second chemical species to yield Diamond. The conditions of this synthesis are suitable for producing Diamond for microelectronics applications.

SUMMARY

It is an object of this invention to produce Diamond by a combinatorial synthesis which affords Diamond efficiently and in high purity without post treatments. Diamond so obtained is suitable for semiconductor and microelectronics applications.

The combinatorial synthesis of the present invention produces Diamond by the reaction of a first chemical species with a second chemical species. It is a convergent synthesis because both of the reactant species, themselves, are chemically derived from their respective source materials.

Much of the related art uses Hydrogen gas in the formation of Diamond. The present invention does not admit Hydrogen to the Diamond forming process. The Hydrogen present in the system of this invention is only that which comprises the molecules of the hydrocarbon sources used. The sources of the reactants are chosen to have the lowest Hydrogen to Carbon ratios possible, such that the presence of Hydrogen in the system is minimized. This minimizes, if not eliminates, interference of Hydrogen in the forward, (Diamond producing) reaction and deters the incorporation of Hydrogen into the Diamond lattice. In the present invention, only the inert gases Helium or Argon are used as carrier or diluent gases. Other more exotic inert gases (Kr, Xe) could be used but are not economically feasible. The addition of a dopant into the Diamond lattice is possible. Selection of a dopant source also requires that its Hydrogen content be minimized.

The present invention uses Acetylene as one of the reactant-producing sources. In contrast to the related art, the Acetylene is not decomposed to afford Diamond-producing Carbon. Rather, it is transformed to a reactive intermediate species. The intermediate derived from Acetylene cannot produce Diamond itself. It must react with a second chemical species to produce Diamond . The second reactive chemical species is highly energetic atomic Carbon which is produced by the decomposition of a hydrocarbon source to afford Carbon and Hydrogen. Thus Diamond is formed by the reaction of atomic Carbon and an intermediate derived from Acetylene, a combinatorial reaction. Neither of the two chemical species alone can produce Diamond under the conditions of the reaction of this inventive process.

The source of atomic Carbon which reacts from the Acetylene derived intermediate must have, as stated, a LOW Hydrogen to Carbon ratio to minimize the potentially deleterious effects of Hydrogen.

In the related art (NON-combinatorial Diamond syntheses), Methane is frequently used as a source of Carbon. Methane can be used in the present invention, but it is not preferred. Its H:C ratio is 4 ($CH_4$). Methane is also difficult to purify. The decomposition of even ultra pure Methane is complicated because it does not yield atomic Carbon cleanly being contaminated with methyl radicals ($CH_3\cdot$), di-radical methylene ($\cdot CH_2\cdot$), and tri-radical methyne ($C\equiv H\cdot$) under almost all conditions under which Methane is decomposed to afford Carbon.

Cubane is the preferred source of atomic Carbon in this invention. Its H:C ratio Is 1 ($C_8H_8$). Other Carbon atom sources having a low H:C ratio which could be used in the process of this invention include Ethane ($C_2H_6$, H:C=3), Cyclopropane (cyclo-$(CH_2)_3$, H:C=2), and Cyclobutane (cyclo-$(CH_2)_4$, H:C=2). These hydrocarbons are also difficult to purify. Their use as atomic Carbon sources is also complicated by the di-radical methylene and tri-radical methyne species.

Unsaturated hydrocarbons are not suitable as atomic Carbon sources for the process of this invention. Sputtered Carbon may be used providing it is of sufficient purity and the sputter energy must be sufficient to preclude Carbon atom clustering.

Cubane is a strained molecule that decomposes readily and cleanly to free Carbon and free Hydrogen, given adequate energy. It is stable enough to be "ultra" purified by sublimation and can be multiply sublimed without significant loss of mass to afford a source material of extremely high purity (<10 ppm) suitable for microelectronics and semiconductor applications. Cubane is subjected to a high energy discharge (microwave, RF, plasma, etc.) as a vapor in an inert carrier gas. A microwave discharge of 1 Kw at 12 Ghz is preferred for Cubane in an inert gas, preferably Argon, at atmospheric pressure flow rates for producing atomic Carbon. Under these highly energetic conditions, ionziation of the carrier gas may assist this process in that inert gas ions may tie up Hydrogen as the metastable inert gas hydride decreasing the deleterious effects of free Hydrogen on the formation of Diamond.

The present invention is a combinatorial reaction which is best described as:

$$A+B\rightarrow C.$$

First species A reacts with second species B to yield product C. A and B are, respectively, an Acetylene-derived intermediate and atomic Carbon. Species C is Diamond. The overall combinatorial Diamond forming process employing Diamond forming reactants derived from their respective source materials is best described as:

$$A\rightarrow A'B\rightarrow C\ A'+C\rightarrow D$$

A is acetylene which produces the reactive intermediate A'. B is the source of atomic Carbon (Cubane) which produces C, Carbon. D is the product, Diamond.

The above reactions are preferably carried out within a reaction chamber that includes a substrate upon which Diamond is deposited. Such reaction chambers include commercially available chemical vapor deposition systems, which are well known to those with ordinary skill in the art. As disclosed, the reactions are conducted at atmospheric pressure, but subatmospheric and superatmospheric pressures may be used.

Spectral examination of Diamond formed by the method of this invention using Raman or Infrared reflectance reveal only peaks associated with Diamond. For example, C—H stretching bands at 2800-3000 $cm^{-1}$ typically observed for CVD Diamond using Methane and/or Hydrogen carrier gas is not observed. Graphitic impurities ($sp^2$ carbon) at 1580 $cm^{-1}$ which are frequently observed in CVD Diamond are not observed. The sharp Raman peak at 1328-1332 $cm^{-1}$ characteristic of Diamond is observed, however.

DETAILED DESCRIPTION OF THE INVENTION

The Diamond producing process of the present invention requires the formation of two reactants from two source materials. The first reactant, (A'), is produced from source material, Acetylene. This is done by contacting Acetylene with a suitable catalyst. Preferred catalysts are Iridium, Platinum, or Rhodium. Other metals may be used as long as they are capable of coordinating to Acetylene and have olefin metathesis activity. Bimetallic catalysts may also be used in the process of this invention. Whatever catalyst or catalysts are chosen, their surface area must be very high, and they must be rigorously cleaned (activated) immediately prior to use. Commercially available high porosity catalytic metal frits may be used. Gas dispersion frits comprising inert materials may be coated using metal halide solutions followed by reductive deposition of the catalytic metal (or metals) using a reducing agent such as hydrazine to produce the high surface area catalyst. Contact with an inert gas plasma for 5-10 minutes is adequate to clean and activate catalysts be they commerically obtained or produced by coating of porous substrates.

The catalyst is optimized so that, when observed by gc/ms, the effluent contains no acetylene decomposition products. I have discovered that the optimal temperature range is between 350° and 370° C. Ideally, undiluted Acetylene would be used. However, Acetylene can be unstable decomposing autogeneously and violently. So, Acetylene is mixed with an inert gas diluent. An 80:20 Acetylene/inert gas mixture is preferred, but lower concentrations of Acetylene can be used. Contact of this mixture with the catalyst produces a reactive transient species which combines with atomic Carbon to produce Diamond.

The second reactant (atomic Carbon) is produced from the hydrocarbon used as the Carbon source, preferably Cubane. Solid Cubane is sublimed by gentle heating in an inert gas carrier and passed through a high energy discharge cell where it is decomposed cleanly to atomic Carbon and Hydrogen. The energetic decomposition may be accomplished using microwave, rf, high voltage DC, plasmas (ICP, DCP) etc. depending upon design features of the reactor used. Commerically available CVD reactors are suitable. Whatever reactor apparatus is used, it must be fitted with a gas chromatograph in tandem with a mass spectrometer (gc/ms) for effluent analysis or monitoring. Many instruments of this type are commercially available.

The atomic Carbon produced from the decomposition of its hydrocarbon parent is reacted with a transient intermediate obtained from Acetylene contacted with a heated catalyst as previously described. The reaction of these two species affords Diamond.

The reaction of this inventive process is stoichiometry dependant. A very large molar excess of Acetylene relative to the Carbon atom source is necessary. I believe that the catalyst effects the formation of a transient species derived from Acetylene which reacts with an atom of Carbon with concomitant ejection of Hydrogen to yield Diamond. I believe that the equilibrium for this transient species and Acetylene is low. This necessitates a very low mass of atomic Carbon to insure that all the Carbon reacts with the transient intermediate. Under the conditions of this inventive process, unreacted atomic Carbon would likely produce undesirable organics, tars, and graphite. The high purity of the Diamond produced by this method is consistent with a lack of excess of free (unreacted) atomic Carbon contaminant.

Without intention of being bound by theory, I believe that this reactive transient species is Tetrahedrane because of the following observations. Conducting this reaction with a catalyst temperature high enough to induce Acetylene decomposition yields tars and polymers. Very little Diamond can be identified, and this material is best described as a low quality Diamond-like Carbon film. The first and most predominant decomposition product of Acetylene is Vinyl Acetylene. If the catalyst temperature is held at the point wherein Vinyl Acetylene is the predominant reactive species tars and polymers are obtained as well as a species is observed at m/e 128 which may be consistent with a structure having a $C_{10}H_8$ stoichiometry. If the catalyst is not heated or is insufficiently heated, no Diamond forms. In this case, only tars and polymers are formed, but the species observed at m/e 128 when Vinyl Acetylene is used is not observed. This would suggest that atomic Carbon reacts with Acetylene but only to produce organics, not Diamond. If a large stoichiometric excess of Acetylene is NOT used, regardless of the catalyst temperature, no Diamond forms, only tars and polymers are obtained.

These findings suggest that Acetylene itself does not react with atomic Carbon to form Diamond. Vinyl Acetylene appears to react with atomic Carbon to afford tars and polymers but no Diamond. However, within a narrow range of catalyst temperatures, Diamond does form if a sufficiently large molar excess of Acetylene relative to the atomic Carbon source (Cubane) is used.

Those of normal skill in the art will recognize that the other possible reactive intermediate produced catalytically from Acetylene is Cyclobutdiene. However, no evidence for the formation of this unstable compound is observed from the gc/ms as no peak at m/e 104 is observed which would be indicative of the dimer of Cyclobutadiene. The Cyclobutadiene dimer and Cubane have the same $C_8H_8$ stoichiometry but no peak consistent with either are observed during the course of the reaction of this invention. (During calibration of mass flow for Cubane prior to the Diamond forming reaction itself, the peak at m/e 104 ($C_8H_8$) for Cubane and its column retention peak are observed by gc/ms.) Cubane is completely decomposed to atomic Carbon during Diamond formation, however.

These results suggest that the reactive transient intermediate produced catalytically from Acetylene which participates in Diamond formation is unsubstituted Tetrahedrane ($C_4H_4$) the dimer of Acetylene ($C_2H_2$), ($C_2H_2)_2$ or $(CH)_4$. Unsubstituted Tetrahedrane has not been observed or isolated. Tetrahedranes bearing four bulky substituents (tetrakis t-butyl and tetrakis trimethylsilyl) have been prepared and characterized and are stable. Thus, the Platonic hydrocarbon structure, Tetrahedrane, is obtainable but only with bulky substituents on all four Carbon atoms stabilizing the structure. (See Maier et al., Angewante Chemie International Edition in English, 17 (7); 520-521 and Maier et al. Tetrahedron Letters Volume 13, Issue 11, 1972, 1025-1030.)

I believe that this unexpected transient intermediate most likely reacts with atomic Carbon which is highly energetic due to the conditions of its formation to produce Diamond by reaction with Tetrahedrane with concomitant Hydrogen ejection. I believe that the atomic Carbon inserts into Tetrahedrane to occupy the tetrahedron cage position.

The success of this reaction depends upon both catalyst temperature and reactant stoichiometry. This would suggest that the equilibrium between Acetylene and its catalytically dimerized reactive intermediate is very low and that this species is very transient. The high purity required for the Diamond produced by this reaction requires that atomic Carbon be completely consumed by the Diamond-forming reaction as unreacted atomic Carbon would likely afford graphitic contaminants rendering the Diamond so obtained useless for its intended purposes and applications.

The stoichiometric excess of Acetylene (to Cubane) used is dependant upon the dilution of Acetylene used. At high dilutions (up to 20% in inert gas), the molar ratio of Acetylene to Cubane is not less than 5000:1. Lower excesses afford impure product. At lower dilutions, (up to 80% Acetylene in inert gas) this ratio may be as low as 2000:1, however.

The catalyst is a finely divided metal having olefin metathesis activity. A very high surface area is required for the catalyst. The aspect ratio should be low. That is, a thin and broad catalyst structure is preferred. Metals having olefin metathesis activity are requisite as catalysts. Bimetallic catalysts or plural metal catalysts having such activity may also be used. Catalyst activity is enhanced by heat, but the temperature should be less than 400° C. as Acetylene decomposes around this temperature. I have found that the ideal catalyst temperature is between 350° C. and 370° C.

The very short life of the intermediate produced by catalytic treatment of Acetylene (Tetrahedrane) demands that the catalyst structure be very close to the deposition target (<=5 mm above the deposition target). Preferably, the catalyst structure's area matches that of the deposition target. The reaction zone is the area between the catalyst structure exit flow and the deposition target. Atomic Carbon is introduced into this area in a manner diffuse enough to ensure good mixing of the atomic Carbon stream with the intermediate stream.

The process of this invention differs from other energy assisted Diamond formation methods in that the high energy used in those processes is directed to the Carbon sources which are transformed into Diamond. In this process, the application of a high energy discharge (rf, microwave, etc.) or a plasma is specific to Cubane (or other source of atomic carbon). It is remote from the catalytically treated Acetylene and from the deposition substrate. That is, it is upstream/remote from the atomic Carbon/Tetrahedrane reaction zone. The discharge energy affects only the Carbon atom source material (Cubane) not the ultimate reactant mixture. The discharge electrode plates are located downstream of the Cubane volatilization cell but remote from the actual reaction zone such that the discharge energy is not delivered to the Diamond formation reaction zone.

There is no limitation to the composition of the deposition substrate except that it be of high surface purity and does not import impurities into the system. The substrate may be heated. Its temperature is not critical. In many CVD Diamond processes, the thermal energy of the heated deposition substrate drives the chemistry of the CVD reaction. In the process of this invention, substrate thermal energy does not drive the reaction chemistry. Diamond forms in the vapor phase and deposits upon the substrate whose thermal energy does not participate in this combinatorial reaction. Substrate heating may be employed for purposes such as Diamond-to-substrate adhesion. Typically, a temperature of no more than 500° C. is used with lower temperatures serving adequately depending upon the substrate. A wide variety of materials are suitable as deposition substrates. Metals and alloys, III/V compounds, II/VI compounds, ceramics, glasses, and even polymers stable to elevated temperatures of the reaction are suitable.

Those skilled in the art will also recognize that rigorously high purity is requisite in this process. If hydrocarbons other than Cubane are used, they must be of at least research purity and must be analyzed by gc/ms to ensure that only a few ppm of impurities are present, all of which must be identifiable.

Cubane may be prepared by the method of Eaton and Cole (JACS 1964; 86(15) pp 962-964). Cubane may also be obtained from commercial sources. It can be purified by multiple re-sublimations which will afford a source material of extremely high purity (<1 ppm by gc/ms).

Acetylene is best obtained by the reaction of Calcium Carbide with a protic solvent having a high freezing point (wet dioxane/t-butanol) The Acetylene gas evolved should be passed through several cold traps to remove solvent impurities. If the $Ca_2C$ is commercially obtained, care must be taken to remove trace Phosphine and Arsine from the Acetylene stream using ion exchange resins, zeolites, and/or molecular sieves specific to such impurities. Other methods of obtaining Acetylene are suitable as long as the material so obtained has fewer than 10 ppm impurities, all of which must be identifiable by gc/ms. For ease of manipulation, Acetylene should be stored under pressure as its admixture with an inert gas preferably at a dilution that will be used in ensuing Diamond forming reactions.

Inert gases (He, Ar) must be treated with a heated Titanium sponge (regardless of their grade of purity) during use to remove the last traces of Oxygen and Nitrogen. Both Acetylene and the atomic Carbon source are delivered in these inert gases.

Those skilled in the art will recognize that, in addition to Carbon, another species may be employed where it is desired to provide a dopant to the tetrahedral Carbon crystal so formed. Preferred dopant sources for Boron, Nitrogen, and Phosphorous are Diborane, Hydrazine, and Diphosphine respectively. The same requirements for rigorous purity apply to the dopant sources as well. Their respective "naked" atoms are obtained in the same manner as is Carbon from Cubane (discharge/plasma). These dopant atoms are reacted with the catalytically produced reactant (from Acetylene) in the same manner as the atomic Carbon atom and simultaneously with the atomic Carbon stream as a third reactant stream but in the much lower concentrations consistent with a dopant.

The high purity necessary for effecting the process of this invention necessitates the use of double manifold (vacuum/inert gas, "Schlenck") lines, and a dry box in load-lock connection with the CVD apparatus for the various transfers of material and apparatus needed for the process of this invention as will be understood by those of normal skill in this art. The apparatus must be subjected to several cycles of (vacuum) pump/(inert gas) purge prior to any manipulations.

The use of gc/ms at the effluent of the reactor is necessary. Aside from monitoring system purity and reaction conditions, it is used to standardize flow rates and concentrations of reactants by peak integration. This data is stored for automatic control in CPU driven CVD reactors such that calibration runs just prior to Diamond synthesis operations can be avoided as these operations consume precious reactant source materials.

BEST MODE FOR CARRYING OUT THE INVENTION

The Cubane sublimation cell is charged with purified Cubane in a dry box, and the charged cell is transferred via the load lock to the CVD reactor. The deposition target is also transferred from the dry box via the load lock into CVD reactor and mounted in its holder. The catalyst is transferred from the dry box via the load lock into the CVD reactor and mounted In its holder. The CVD reactor is evacuated and purged with inert gas contacted with a heated Titanium sponge from the Schlenck line. After several pump/purge cycles, The gc/ms is connected to the reactor effluent port and is engaged to monitor for trace impurities. When reactor ambient is below 1 ppm, It is ready for the reaction.

Purified Acetylene is transferred from storage by a pressure regulator to evacuated volumetric globes operatively connected to the Schlenck line and the CVD reactor. Considerable excess Acetylene is used, but it can be recovered from the effluent for recycling. A flow of inert gas is directed to the catalyst structure, and discharge electrode plates disposed upstream of it are energized to 1 Kw at 12 GHz to produce an inert gas plasma (He or Ar) for 5-10 minutes to insure a clean and active catalyst surface and a clean deposition target surface. Then, the discharge energy is discontinued, but flow of inert gas is continued.

The Cubane sublimation cell is energized with concomitant flow of inert gas to adjust the flow rate appropriate for the scale of the reaction to be conducted using gc/ms and stored calibration parameters. This flow is directed away from the deposition cell at this time, and Microwave discharge is not engaged at this time. An inert gas flow through the un-energized microwave discharge cell is maintained, however.

Acetylene flow through the catalyst is initiated but it is diverted from/around the deposition target The flow of the Acetylene/inert gas diluent is adjusted using gc/ms peak integration and stored calibration data to obtain the desired molar excess of Acetylene to Cubane. Neither the catalyst nor the deposition target are heated during this operation.

Once the flow rates of Acetylene and Cubane are adjusted, the catalyst is brought to its optimum operating temperature. Thereupon, the microwave discharge cell is energized (1 Kw at 12 Ghz). The deposition cell is rapidly brought to its desired operating temperature. The reaction is begun by directing both reactant flows to the reaction zone.

The reaction effluent is monitored by gc/ms. Scanning of Diamond film growth, qualitatively, is possible if the reactor is fitted with an FT-IR reflectance instrument or a Raman scattering instrument.

To terminate the reaction, Cubane flow is diverted from the reaction zone, and cessation of power to the microwave discharge cell and the sublimation cell is effected. At the same time, the Acetylene/inert gas mixture flow is ceased, but but inert gas (only) is allowed to flow through the catalyst structure, and power to catalyst and deposition target heaters is discontinued.

The system is allowed to cool. The deposition target coated with Diamond is transferred to the dry box via the load lock as are the Cubane sublimation cell and the catalyst structure.

For a 1 mmol scale reaction, an 80/20 (v/v) Acetylene/Argon mixture flow of 15.5 ml/second and a flow of 0.62 ml/second of 1% Cubane in Argon Is used for 1 hour at essentially atmospheric pressure. A catalyst temperature of 360° C., and a deposition target temperature of 460° C. is maintained during the reaction using a Pt foil disk (0.2 mm thick, 1 cm diameter). The Diamond film obtained is verified spectrally (Raman and FT-IR reflectance), by thermal conductivity, and durometrically. Mass gain for the film is 473 mg, 98.5% of theoretical. The film is 1.74 mm thick.

I claim:

1. A method for combinational vapor phase synthesis of diamond in an oxygen free environment, said method comprising:
   a) exposing acetylene to a heated metal catalyst having olefin metathesis activity, thereby forming a first reactive species, said first reactive species being a transient intermediate;
   b) obtaining a second reactive species, said second reactive species being derived from a hydrocarbon source subjected to a high energy discharge or plasma, said second reactive species being a highly reactive atomic carbon; and
   c) reacting said first reactive species with said second reactive species, thereby forming diamond, wherein said first reactive species and said second reactive species are in a vapor phase for the formation of the diamond, and wherein the metal catalyst is maintained at a temperature below that at which the decomposition of acetylene occurs.

2. The method of claim 1 wherein the source of said hydrocarbon is selected from the group consisting of cubane, methane, ethane, cyclopropane, and cyclobutane.

3. The method of claim 2 wherein the reactive carbon atom is produced by exposing said carbon atom source to a high energy discharge or a plasma.

4. The method of claim 1 wherein the metal catalyst is comprised of at least one metal.

5. The method of claim 4 wherein the metal is selected from the group consisting of platinum, iridium, rhodium, palladium, cobalt, silver, ruthenium, and combinations thereof.

6. The method of claim 1, further comprising the use of a reaction chamber, wherein a stream of said reactive atomic carbon and a stream of said intermediate species impinge, just above a deposition substrate of said reaction chamber.

7. The method of claim 6 wherein a source for the reactive atomic carbon is cubane.

8. The method according to claim 7, wherein a hydrocarbon sublimation cell is energized with a concomitant flow of inert gas.

9. The method according to claim 6, wherein the acetylene is mixed with an inert carrier gas prior to being exposed to the metal catalyst.

10. The method according to claim 1, wherein the temperature of the catalyst is maintained in the range between about 350 degrees Celsius and 370 degrees Celsius.

11. The method according to claim 1, further comprising adding a dopant simultaneously with the highly reactive atomic carbon during a reaction.

12. The method according to claim 1, wherein the high energy discharge is accomplished by an energy source selected from the group consisting of microwaves, radio frequencies, high voltage direct current, and plasma energy sources.

13. The method according to claim 1, wherein acetylene is present in a stoichiometric excess to the hydrocarbon.

14. A method for combinational vapor phase synthesis of diamond in an oxygen free environment, said method comprising:
   a) exposing acetylene to a heated metal catalyst having olefin metathesis activity, thereby forming, a first reactive species, said first reactive species being a transient intermediate;
   b) obtaining a second reactive species, said second reactive species being derived from cubane subjected to a high energy discharge or plasma, said second reactive species being a highly reactive atomic carbon; and
   c) reacting said first reactive species with said second reactive species, thereby forming diamond, wherein said first reactive species and said second reactive species are in a vapor phase for the formation of the diamond, and wherein the metal catalyst is maintained at a temperature below that at which the decomposition of acetylene occurs.

* * * * *